(12) United States Patent
Maltezos et al.

(10) Patent No.: US 10,015,442 B1
(45) Date of Patent: Jul. 3, 2018

(54) THREE-WAY VIDEO CALLING ON HINGED MULTI-SCREEN DEVICE

(71) Applicant: Microsoft Technology Licensing, LLC, Redmond, WA (US)

(72) Inventors: Mario Emmanuel Maltezos, Redmond, WA (US); Christian Michael Sadak, Seattle, WA (US); Bryant Daniel Hawthorne, Duvall, WA (US); John Benjamin Hesketh, Kirkland, WA (US); Andrew Austin Jackson, Bellevue, WA (US); Adolfo Hernandez Santisteban, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/640,200

(22) Filed: Jun. 30, 2017

Related U.S. Application Data (60) Provisional application No. 62/505,755, filed on May 12, 2017.

(51) Int. Cl.
*H04N 7/14* (2006.01)
*G06F 1/16* (2006.01)

(52) U.S. Cl.
CPC ............ *H04N 7/144* (2013.01); *H04N 7/147* (2013.01); *G06F 1/1618* (2013.01); *G06F 1/1647* (2013.01); *G06F 1/1677* (2013.01)

(58) Field of Classification Search
None
See application file for complete search history.

(56) References Cited

U.S. PATENT DOCUMENTS

| 8,189,029 | B2 | 5/2012 | de Lind van Wijngaarden et al. |
| 8,451,312 | B2* | 5/2013 | Lee ......... H04N 7/142 345/156 |
| 9,317,198 | B2 | 4/2016 | Kwak et al. |
| 9,588,668 | B2 | 3/2017 | Selim |
| 2008/0297589 | A1 | 12/2008 | Kurtz et al. |

(Continued)

FOREIGN PATENT DOCUMENTS

| WO | 2015175113 A1 | 11/2015 |
| WO | 2016080559 A1 | 5/2016 |

OTHER PUBLICATIONS

Burgess, Matt, "WhatsApp launches video calling for one billion people. Here's how to use it", http://www.wired.co.uk/article/whatsapp-video-calling-iphone-android-app-new, Published on Nov. 15, 2016, 5 pages.

(Continued)

*Primary Examiner* — Stella Woo
(74) *Attorney, Agent, or Firm* — Alleman Hall Creasman & Tuttle LLP (57) ABSTRACT

A mobile computing device is provided that includes a processor, an accelerometer, and a housing with two parts, the first part including a first camera and a first display device, and the second part including a second camera and a second display device. When a predetermined trigger condition is satisfied, the processor is configured to cause the first and second display devices to each simultaneously display image data captured by the second camera, and image data received from a remote computing device.

17 Claims, 7 Drawing Sheets

(56) References Cited

U.S. PATENT DOCUMENTS

| | | | |
|---|---|---|---|
| 2010/0182265 A1* | 7/2010 | Kim | G06F 1/1616 345/173 |
| 2012/0084714 A1* | 4/2012 | Sirpal | G06F 1/1616 715/790 |
| 2013/0021266 A1* | 1/2013 | Selim | G06F 3/0487 345/173 |
| 2013/0076679 A1 | 3/2013 | Kretz | |
| 2013/0293581 A1 | 11/2013 | Wissner-gross et al. | |
| 2013/0328997 A1* | 12/2013 | Desai | H04N 7/141 348/14.02 |
| 2014/0285476 A1 | 9/2014 | Cho et al. | |
| 2015/0324002 A1 | 11/2015 | Quiet et al. | |

OTHER PUBLICATIONS

Webb, Sam, "Samsung files patent for a phone with Two Screens to make reading, gaming and conference calls easier", http://www.dailymail.co.uk/sciencetech/article-2525812/Double-vision-Samsung-unveils-phone-two-screens-easier-reading-gaming-video-conferencing.html, Published on Dec. 18, 2013, 5 pages.

\* cited by examiner

THREE-WAY VIDEO CALLING ON HINGED MULTI-SCREEN DEVICE

CROSS REFERENCE TO RELATED APPLICATIONS

This application claims priority to U.S. Provisional Patent Application No. 62/505,755, filed on May 12, 2017, the entirety of which is hereby incorporated herein by reference.

BACKGROUND

Users interact with multi-screen mobile devices throughout a variety of positions, including holding the device vertically, holding the device with a primary screen facing toward the user, holding the screen with a second screen facing toward the user, and other positions and orientations. Conventionally, it may be difficult for users in the same physical space to be part of a video call when they are not in proximity to one another, especially when there are three or more participants. They may lose sight of each other or a remote user, and it may be difficult to tell if the users are in frame of the cameras recording them.

SUMMARY

To address the above issues, a mobile computing device is provided. The mobile computing device may comprise a housing having a first part and a second part, the first part including a first display and the second part including a second display. A first camera may be mounted in the first part of the housing, and a second camera mounted in the second part of the housing. A processor may be mounted in the housing and configured to operate in a camera mode in which the processor is configured to process image data captured by the first and second cameras. When a predetermined trigger condition is satisfied, the processor is configured to cause the first display to concurrently display a video feed of the image data captured by the second camera and a video feed of image data received via a computer network from a remote computing device, and to cause the second display to concurrently display the video feed of image data captured by the second camera and the video feed of image data received via the computer network from the remote computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed in detail below, conventional video calling applications may inconvenience users by not allowing three or more participants to see each other on the display screens. The systems and methods described herein have been devised to address these challenges.

Figure 1:
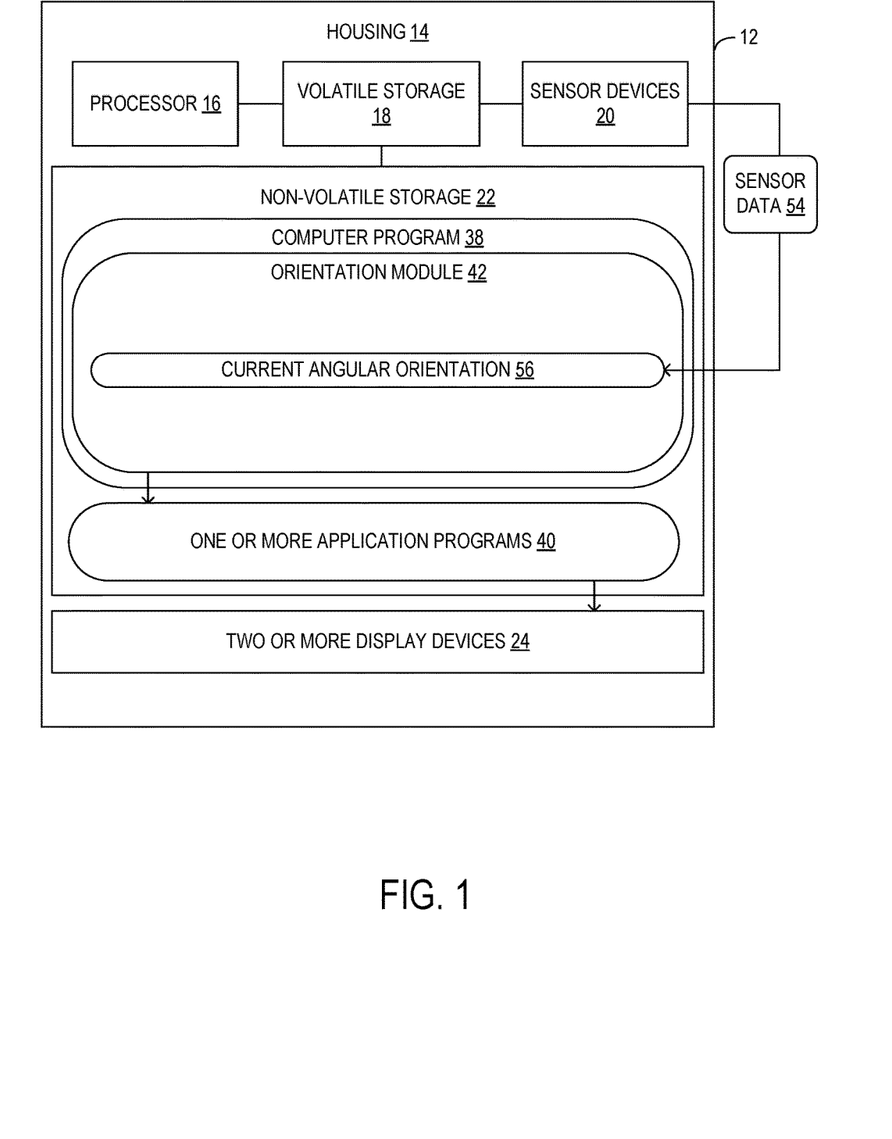
FIG. 1 shows an example mobile computing device of the present description.

FIG. 1 illustrates a mobile computing device 12 that includes a housing 14, which, for example, may take the form of a casing surrounding internal electronics and providing structure for displays, sensors, speakers, buttons, etc. The housing 14 is configured to include a processor 16, volatile storage device 18, sensor devices 20, non-volatile storage device 22, and two or more display devices 24. The mobile computing device 12 may, for example, take the form of a smart phone device. In another example, the mobile computing device 12 may take other suitable forms, such as a tablet computing device, a wrist mounted computing device, etc.

Figures 2A, 2B:
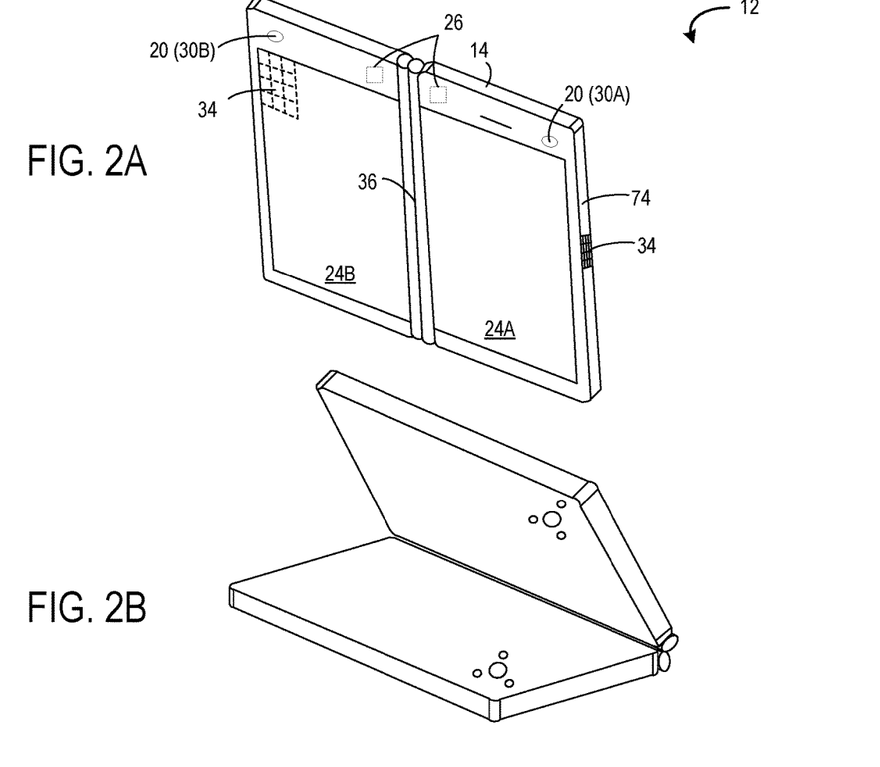
FIG. 2A shows an example of two display screens arranged in a side-by-side orientation for the mobile computing device of FIG. 1.
FIG. 2B shows an example of two display screens arranged in a reflex orientation for the mobile computing device of FIG. 1.

Turning to FIG. 2A, an example mobile computing device 12 is illustrated. As shown, the example mobile computing device 12 includes a housing 14. As discussed above, the housing 14 may be configured to internally house various electronic components of the example mobile computing device 12, including the processor 16, volatile storage device 18, and non-volatile storage device 22. Additionally, the housing 14 may provide structural support for the display devices 24 and the sensor devices 20. The sensor devices 20 may include a plurality of different sensors, such as, for example, an accelerometer 26, forward facing cameras 30A and 30B, etc. The sensor devices 20 may also include a capacitive touch sensor 34, such as a capacitive array that is integrated with each of the two or more display devices 24. In another example, the sensor devices 20 may include camera-in-pixel sensors that are integrated with each of the two or more display devices 24. It will be appreciated that the examples listed above are exemplary, and that other types of sensors not specifically mentioned above may also be included in the sensor devices 20 of the mobile computing device 12. In the illustrated example, the sensor devices 20 include one or more accelerometers 26 that are contained by the housing 14. The sensor devices 20 may further include forward facing cameras 30A and 30B. In one example, the forward-facing cameras 30A and 30B include RGB cameras. However, it will be appreciated that other types of cameras may also be included in the forward-facing cameras 30A and 30B. In this example, forward facing is a direction of the camera's associated display device. Thus, in the example of FIG. 2A, as the screens for both of an example pair of display devices 24A and 24B are facing the same direction, both of the forward-facing cameras 30A and 30B are also facing the same direction.

As shown, the sensor devices 20 may also include capacitive touch sensors 34 that are integrated with the pair of display devices 24A and 24B, as well as other additional displays. In the illustrated embodiment, the capacitive touch sensors 34 include a capacitive grid configured to sense changes in capacitance caused by objects on or near the display devices, such as a user's finger, hand, stylus, etc. In one embodiment, the capacitive touch sensors 34 may also be included on one or more sides of the mobile computing device 12. For example, the capacitive touch sensors 34 may be additionally integrated into the sides of the housing 14 of the mobile computing device 12. While the capacitive touch sensors 34 are illustrated in a capacitive grid configuration, it will be appreciated that other types of capacitive touch sensors and configurations may also be used, such as, for example, a capacitive diamond configuration. In other examples, the sensor devices 20 may include camera-in-pixel devices integrated with each display device including the pair of display devices 24A and 24B. It will be appreciated that the sensor devices 20 may include other sensors not illustrated in FIG. 2A.

In the example mobile computing device 12 illustrated in FIG. 2A, the two example display devices 24A and 24B are movable relative to each other. As shown, the example mobile computing device 12 includes a housing 14 including the processor 16, the accelerometer 26, and the two or more display devices 24, the housing including a hinge 36 between a pair of display devices 24A and 24B of the two or more display devices 24, the hinge 36 being configured to permit the pair of display devices 24A and 24B to rotate between angular orientations from a face-to-face angular orientation to a back-to-back angular orientation.

In one implementation, the face-to-face angular orientation is defined to have an angular displacement as measured from display to display of between 0 and 90 degrees, an open angular orientation is defined to be between 90 and 270 degrees, and a back-to-back orientation is defined to be from 270 to 360 degrees. Alternatively, the face-to-face angular orientation may be defined to be between 0 and 180 degrees and the back-to-back angular orientation may be defined to be between 180 and 360 degrees. In either of these implementations, when tighter ranges are desired, the face-to-face angular orientation may be defined to be between 0 and 60 degrees, or more narrowly to be between 0 and 30 degrees, and the back-to-back angular orientation may be defined to be between 300 and 360 degrees, or more narrowly to be 330 and 360 degrees. The zero degree position may be referred to as fully closed in the fully face-to-face angular orientation and the 360 degree position may be referred to as fully open in the back-to-back angular orientation. In implementations that do not use a double hinge and which are not able to rotate a full 360 degrees, fully open and/or fully closed may be greater than zero degrees and less than 360 degrees.

Now turning to FIG. 2B, the hinge 36 permits the pair of display devices 24A and 24B to rotate relative to one another such that an angle between the pair of display devices 24A and 24B can be decreased or increased by the user via applying suitable force to the housing 14 of the mobile computing device 12. As shown in FIG. 2B, the pair of display devices 24A and 24B may be rotated until the pair of display devices 24A and 24B reach a back-to-back angular orientation as shown in FIG. 2C.

Figures 2C, 2D:
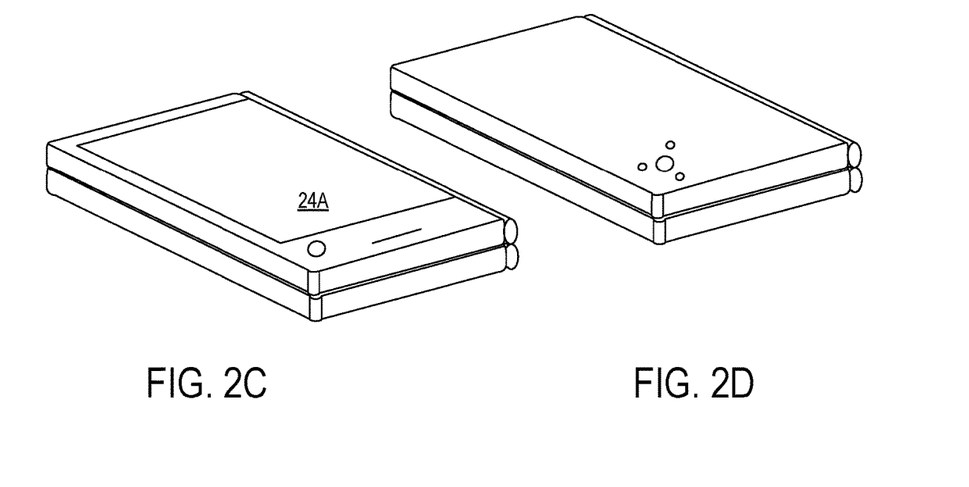
FIG. 2C shows an example of two display screens arranged in a back-to-back orientation for the mobile computing device of FIG. 1.
FIG. 2D shows an example of two display screens arranged in a front-to-front orientation for the mobile computing device of FIG. 1.

As illustrated in FIG. 2C, while in an angular orientation where the pair of display devices 24A and 24B are in a back-to-back angular orientation, the pair of display devices 24A and 24B face away from each other. Thus, while using the mobile computing device 12, the user may only be able to view one of the display devices of the pair of display devices 24A and 24B at a time. Additionally, while in a back-to-back angular orientation, sensor packages of the sensor devices, which may each include forward facing cameras 30A and 30B, also face in the same direction as their respective display device, and thus also face away from each other. Alternatively, back-to-back orientation may be defined as a rotational angle range, between 270 and 360 degrees and between 310 and 360 degrees, for example.

As shown in FIG. 2D, the angular orientation between the pair of display devices 24A and 24B may also rotate to a face-to-face orientation where the pair of display devices face each other. Such an angular orientation may help protect the screens of the display devices.

Turning back to FIG. 1, the processor 16 is configured to execute a computer program 38, which, for example, may be an operating system or control program for the mobile computing device, and one or more application programs 40 stored on the non-volatile storage device 22, and to enact various control processes described herein. In some examples, the processor 16, volatile storage device 18, and non-volatile storage device 22 are included in a System-On-Chip configuration.

The computer program 38 executed by the processor 16 includes an orientation module 42. As shown in FIG. 1, the orientation module 42 is configured to receive sensor data 54 from the sensor devices 20. Based on the sensor data 54, the orientation module 42 is configured to detect a current angular orientation 56 between the pair of display devices 24A and 24B indicating that the pair of display devices 24A and 24B are facing away from each other. As discussed previously, the angular orientation between the pair of display devices 24A and 24B may rotate through angular orientations between a face-to-face angular orientation to a back-to-back angular orientation. Thus, the orientation module 42 is configured to detect a current angular orientation 56 indicating that the pair of display devices 24A and 24B are facing away from each other, such as a back-to-back angular orientation.

The orientation module 42 may be configured to detect the current angular orientation 56 based on different types of sensor data. In one embodiment, the sensor data 54 may include accelerometer data received via the accelerometers 26. As the user applies force to the housing 14 of the mobile computing device 12 to rotate the pair of display devices 24A and 24B, the accelerometers 26 will detect the resulting movement as angle sensors. Thus, based on accelerometer data for a new rotation and a previously known angular orientation between the pair of the display devices 24A and 24B, the orientation module 42 may calculate a new current angular orientation 56 resulting after the user rotates the pair of display devices 24A and 24B around the hinge 36. However, it will be appreciated that the current angular orientation 56 may also be calculated via other suitable methods. For example, the sensor devices 20 may further include an angle sensor such as a hinge angle sensor in the hinge 36 that is coupled to the hinge and configured to detect an angular orientation of the hinge 36, and thereby detect a current relative angular orientation or relative angular displacement of the pair of display devices 24A and 24B. Alternatively, the angle sensor a pair of inertial measurement units, such as accelerometers 26.

Figure 3A:
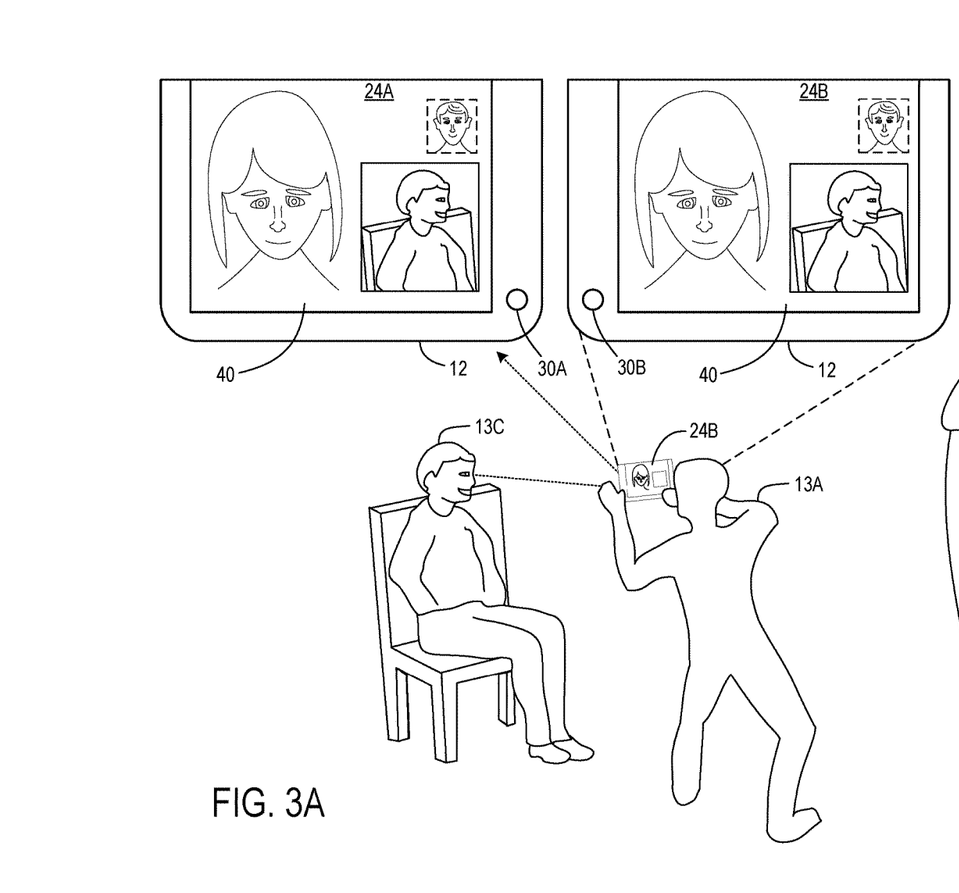
FIG. 3A shows an example use case of two users interacting with two display screens arranged in a back-to-back angular orientation for the mobile computing device of FIG. 1 and executing a video calling application.
Figure 3B:
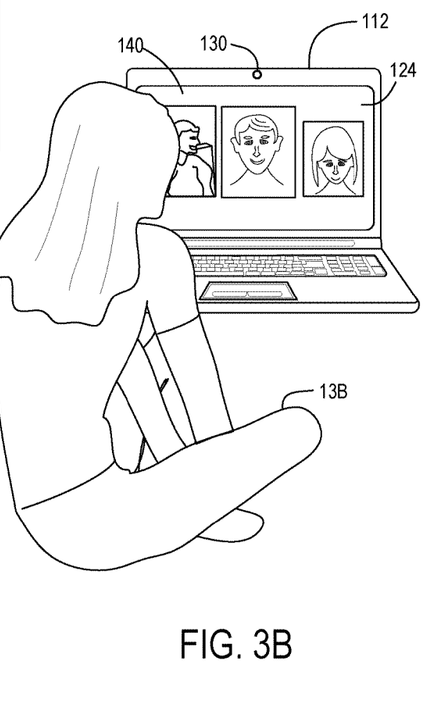
FIG. 3B shows an example use case of a user interacting with a mobile computing device that has established a data connection with the mobile computing device of FIG. 3A.

Referring to FIGS. 3A and 3B, an example use case illustrating aspects of the present disclosure will now be presented. A first user 13A may be capturing live video images of a third user 13C using camera 30A facing the third user 13C, executing a video calling application 40 that displays live video images of the third user 13C on both display devices 24A and 24B so as to stream a video feed when the mobile computing device 12 is in a back-to-back angular orientation. Simultaneously, camera 30B is capturing live video images of the first user 13A operating the mobile computing device 12 so as to stream a video feed. At the same time, as depicted in FIG. 3B, a second user 13B is in a separate location using a mobile computing device 112, which has established a data connection with mobile computing device 12 through a network, executing a separate instantiation of the video calling application 140, capturing video of the second user 13B using camera 130 facing the second user 13B so as to stream a video feed. Simultaneously, the display 124 of the mobile computing device 112 concurrently displays live video images of the first user 13A captured by camera 30B, live video images of the third user 13C captured by camera 30A, and live video images of the second user 13B captured by camera 130. The video calling application 140 receives live video image data from the both cameras 30A and 30B of mobile computing device 12, and simultaneously sends live video image data from camera 130 to mobile computing device 12. The live video image data from camera 130, received by the mobile computing device 12, is then concurrently displayed on both display devices 24A and 24B so as to be visible to both the first user 13A and the third user 13C. Accordingly, each participant in the three-way video calling session is able to view all three participants, including themselves, either on a display screen or in direct line-of-sight between users.

Figure 4A:
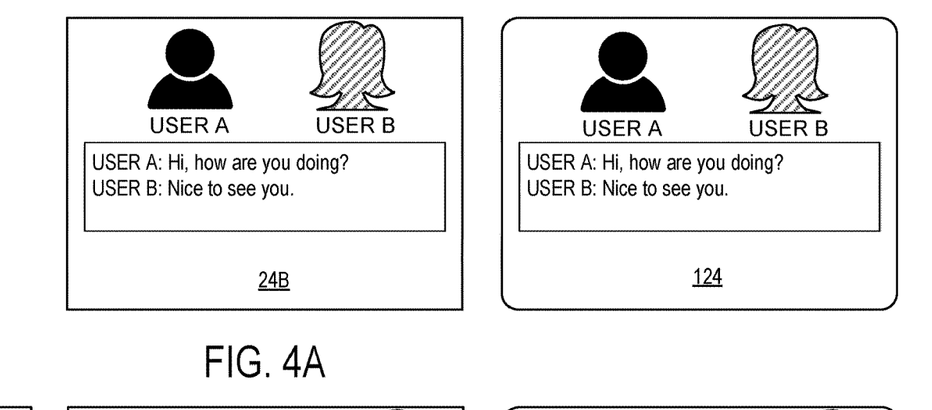
FIGS. 4A and 4B show a transition between a one-on-one video mode and a three-way video mode in the example use case of FIGS. 3A and 3B.
Figure 4B:
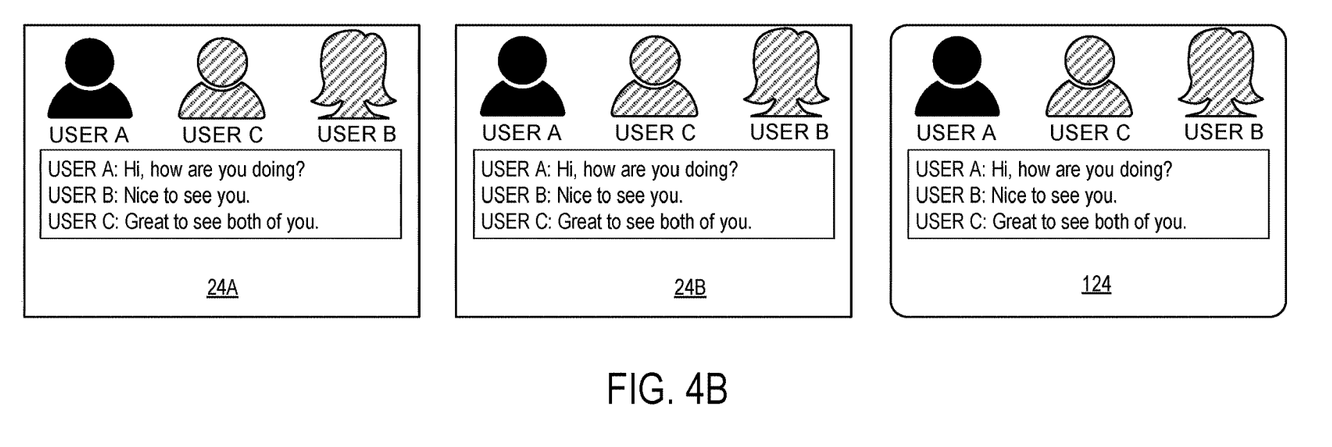

Referring to FIGS. 4A and 4B, a transition between a one-on-one video mode (two-way mode) and a three-way video mode (group video chat mode) in the example use case of FIGS. 3A and 3B will now be illustrated. In FIG. 4A, the first user 13A (user A) and the second user 13B (user B) are chatting on a video calling application in camera mode that is a two-way mode, where camera 30B is capturing live video images of the first user 13A, and camera 130 is capturing live video images of the second user 13B. Accordingly, live video images of both the first user 13A and the second user 13B are displayed on displays 24A and 124 in split screen. But as soon as a predetermined trigger condition is satisfied, the video chat application transitions the camera mode from a one-to-one mode to a three-way video mode in which live video images of three users are visible as live streaming video on each display of the display devices used by each of the three users, as depicted in FIG. 4B. The predetermined trigger condition is preferably the sensing of the back-to-back orientation of the hinged display device 12.

Unlike the one-on-one video calling feature depicted in FIG. 4A, the group video chat mode depicted in FIG. 4B allows three users to appear in split-screen at the same time on each display of the display devices used by the three users. Upon detecting the predetermined trigger condition, camera 30A of the hinged display device 12 starts capturing live video images of a third user 13C (user C), and live video images of the first user 13A, the second user 13B, and the third user 13C are displayed on displays 24A, 24B, and 124. It will be appreciated that other video calling application features may be visible as live video images of the users are being displayed on the displays, such as instant text messaging boxes (illustrated in FIGS. 4A and 4B) and live screenshot images of the displays (not illustrated). Further, the group video chat session may be broadcast to other users such that the live video images of all three users are visible to other users through live video streaming. The other users may then be able to listen to and view the three users, and may participate in the group video session by sending content (text messages, images, video clips, emojis, and emoticons, for examples) and/or listening and talking over during the group video chat session. Further, the group video chat mode of the video calling application may be configured to display live video images of a fourth user and even a fifth user if the displays can accommodate and display split screen images of four or five users on the displays.

Figure 5:
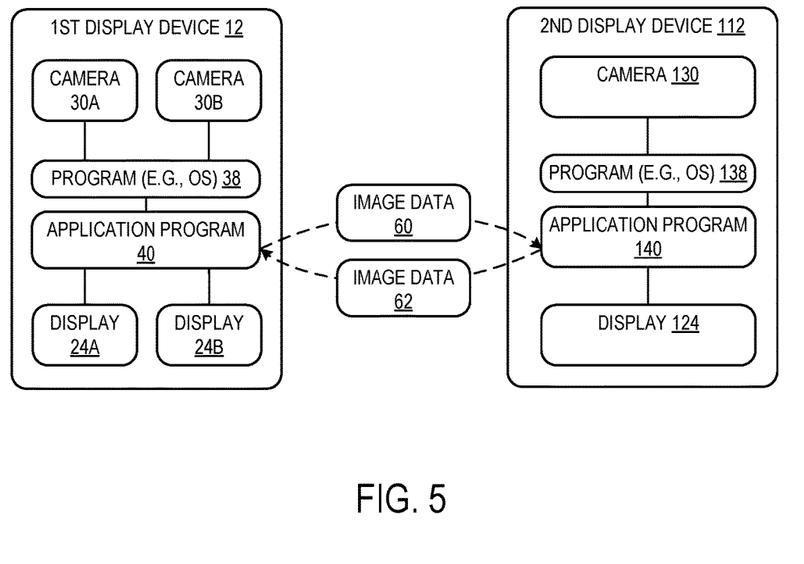
FIG. 5 shows a schematic representation of an exemplary embodiment of two display devices exchanging image data with one another, at least one of the display devices being the mobile computing device of FIG. 1.

FIG. 5 is a schematic illustration of a first display device 12, executing a video calling application 40, interacting with a second display device 112 executing another instantiation of the video calling application 140. The display devices 12 and 112 may be communicatively coupled to each other via a wired connection or a wireless connection to a network. In some examples, the network may take the form of a local area network (LAN), wide area network (WAN), wired network, wireless network, personal area network, or a combination thereof, and may include the Internet. In the example of FIG. 5, the first display device 12 is communicatively coupled to the second display device 112 via one or more networks. In other examples, the display devices may also be operatively connected with additional devices.

The one or more processors of the first display device 12 execute a program 38 to determine that the device has satisfied a predetermined trigger condition, and receive and process sensor data from the cameras 30A and 30B. The predetermined trigger condition is in one example the sensing of the back-to-back orientation of the device. However, the predetermined trigger condition is not particularly limited, and the initiation of the three-way calling method may alternatively be the sensing of a user input, a user operation of a physical or virtual button on the device, a scheduled timing, and/or input by a remote user, for example. Nevertheless, the sensing of the back-to-back orientation of the device as the predetermined trigger condition is preferable for the hinged display device 12 due to the simplicity of user operation. The program 38 may be program logic of an operating system, for example. The one or more processors of the first display device 12 may apply program logic of a video calling application 40. Upon establishing a data connection with the second display device 112, the video calling application 40 sends live video image data 60 from camera 30A and camera 30B to the video calling application 140 executed by the second display device 112, and receives live video image data 62 from camera 130 of the second display device 112. The application 40 subsequently causes both display devices 24A and 24B to concurrently display live video images captured by cameras 30A, 30B, and 130.

The one or more processors of the second display device 112 execute a program 138 to receive and process sensor data from the camera 130. The program 138 may be program logic of an operating system, for example. The one or more processors of the first display device 12 may also apply program logic of a video calling application 140. Upon establishing a data connection with the first display device 12, the video calling application 140 receives live video image data 60 from camera 30A and 30B on the first display device 12, and sends live video image data 62 from camera 130 of the second display device 112. The application 140 subsequently causes the display device 124 to concurrently display live video images captured by camera 30A, camera 30B, and camera 130.

Although the embodiment of FIG. 5 describes the displays 24A and 24B as displaying image data from cameras 30A, 30B, and 130, and the display 124 as displaying image data from cameras 30A, 30B, and 130, it will be appreciated that the video calling applications 40 and 140 may also have user customizable settings to change display settings for each of the display devices depending on user preferences. Each of the display devices 24A, 24B, and 124 may be separately configured and customized to concurrently display any permutation of image data: for example, display only image data from one of cameras 30A, 30B, and 130; display any two of image data from cameras 30A, 30B, and 130; or display image data from all three cameras 30A, 30B, and 130 according to user preferences.

Figure 6:
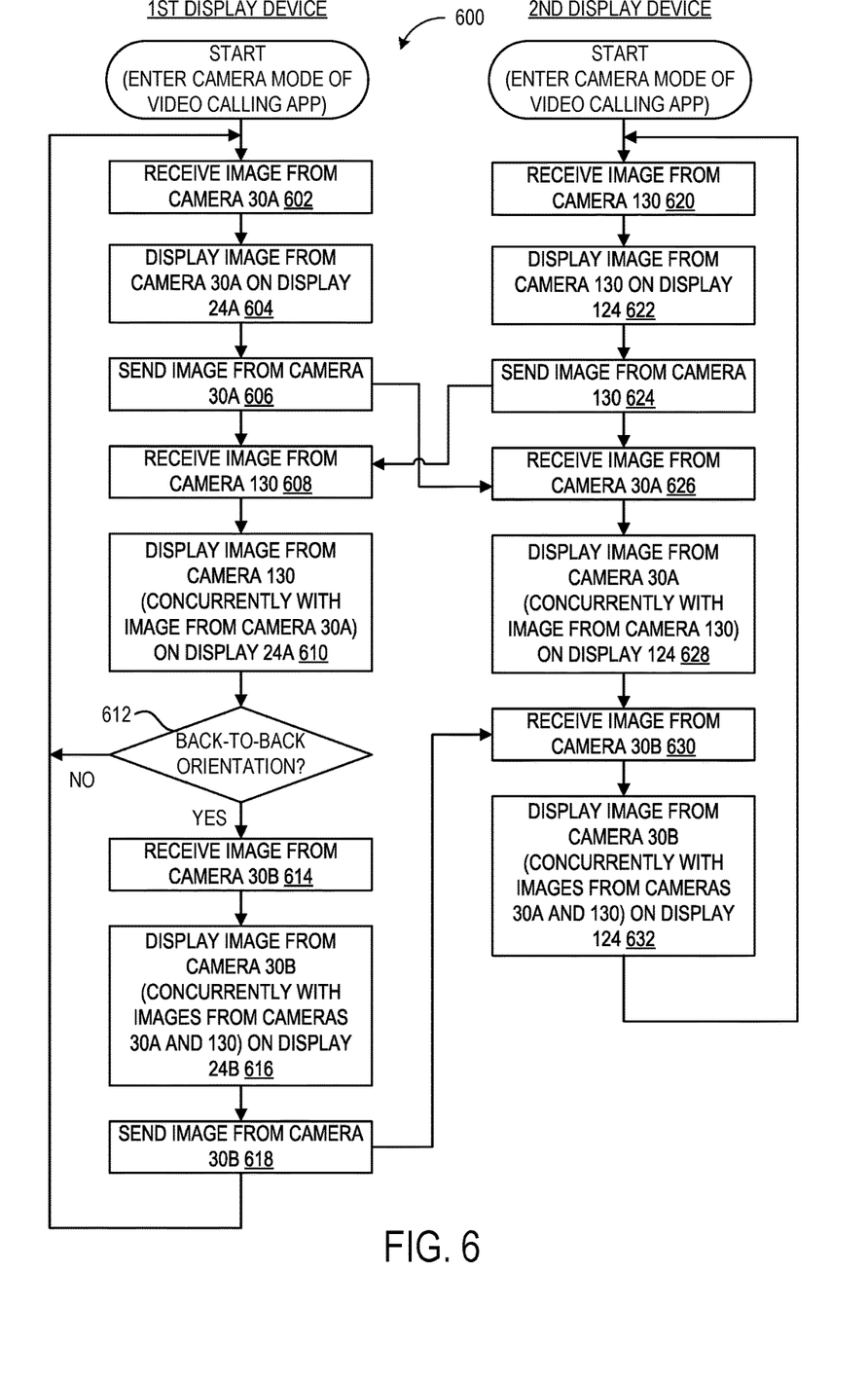
FIG. 6 shows a flow chart of a method for sharing and displaying image data between two mobile computing devices based on a hinge movement according to one example of the present disclosure.

FIG. 6 illustrates a method 600 for sharing and displaying image data between two mobile computing devices based on hinge movement. The following description of method 600 is provided with reference to the software and hardware components described above and shown in FIGS. 1-5. It will be appreciated that method 600 also may be performed in other contexts using other suitable hardware and software components.

With reference to FIG. 6, at 602 the method 600 may include the program in the first display device receiving sensor data (live video image data) from camera 30A. At 604 the video calling application may be configured to cause display 24A to display live video image data from camera 30A. At 606 the video calling application sends live video image data from camera 30A to the second display device. At 608 the video calling application receives live video image data from camera 130 of the second display device. At 610 the video calling application subsequently causes display 24A to display live video image data from camera 130 concurrently with the display of live video image data from camera 30A.

At 612 the orientation module may calculate a current angular orientation of the multi-screen device based on the sensor data from the hinge angle sensor or accelerometers and determine if the first display device is in a back-to-back angular orientation, in which cameras 30A and 30B face opposite directions. If the first display device is determined not to be in a back-to-back angular orientation, at 612 the video calling application is configured to return to step 602. If the first display device is determined to be in a back-to-back angular orientation, at 614 the program in the first display device receives image data from camera 30B. At 616 the video calling application subsequently moves into a group video chat mode and causes display 24B to display live video image data from camera 30B concurrently with the display of live video image data from cameras 30A and 130. At 618 the video calling application sends live video image data from camera 30B to the second display device. Then the method 600 returns to step 602.

Further with reference to FIG. 6, at 620 the method 600 may include the program in the second display device receiving sensor data (live video image data) from camera 130. At 622 the video calling application may be configured to cause display 124 to display live video image data from camera 130. At 624 the video calling application sends live video image data from camera 130 to the first display device. At 626 the video calling application receives live video image data from camera 30A of the first display device. At 628 the video calling application subsequently causes display 124 to display live video image data from camera 30A concurrently with the display of live video image data from camera 130. At 630 the video calling application receives live video image data from camera 30B. At 632 the video calling application subsequently causes display 124 to display live video image data from camera 30B concurrently with the display of live video image data from cameras 30A and 130. The method 600 then returns to step 620.

It will be appreciated that the reception and display of image data from the cameras are executed in real-time so that a seamless video calling experience is achieved for all three users operating the first display device and the second display device. Thus, the cameras 30A, 30B, and 130 perform simultaneous video recording in real-time. Further, since the predetermined trigger condition for transitioning from a one-on-one video mode to a group video chat mode is the sensing of a back-to-back orientation of the hinged display device, the user can easily switch between video modes using a simplified user operation.

Although the embodiments depicted in FIGS. 3A, 3B, 4A, 4B, 5, and 6 describe the second display device 112 having only one display 124 and one camera 130, it will be appreciated that the number of display devices and cameras on the second display device 112 is not particularly limited, and may include two cameras and two display devices like the first display device 12, for example. In such examples, image data from the two cameras of the first display device 12 and image data from the two cameras of the second display device 112 may be shared between the two mobile computing devices. Furthermore, each of the four display devices in the two mobile computing devices may be subsequently configured and customized by the user to display any permutation of image data: for example, display any one, two, three, or all four of image data from the four cameras according to user preference. Image data may also include audio data as well as streaming video data. Accordingly, the multi-screen device provides viewfinders for users of the multi-screen device to let them know that the video recording is effectively framed according to their preferences (with the correct image zoom and background view, for example), and also provide video images of at least one remote user participating in the video call, so that a seamless, enhanced video calling experience is achieved for all participants, with all the participants being able to see each other in real-time without missing any facial reactions.

Figure 7:
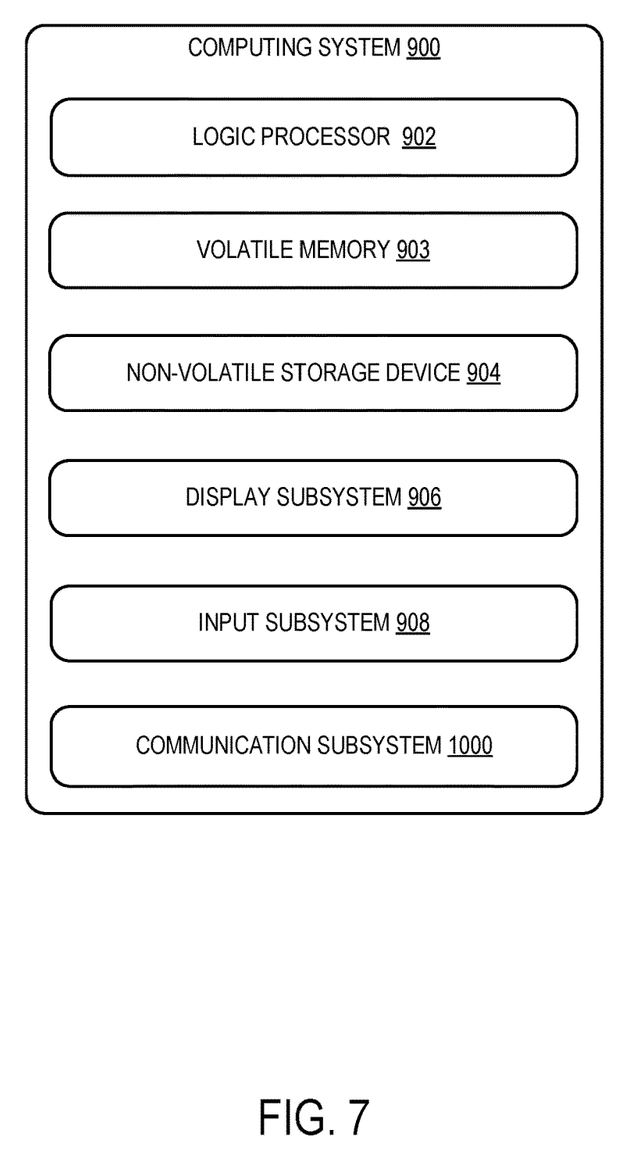
FIG. 7 shows an example computing system according to an embodiment of the present description.

FIG. 7 schematically shows a non-limiting embodiment of a computing system 900 that can enact one or more of the methods and processes described above. Computing system 900 is shown in simplified form. Computing system 900 may embody the mobile computing device 12 of FIG. 1 or the second display device 112 of FIGS. 3B and 5. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 7.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local-or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a mobile computing device comprising a housing having a first part and a second part, the first part including a first display and the second part including a second display; a first camera mounted in the first part of the housing; a second camera mounted in the second part of the housing; and a processor mounted in the housing and configured to operate in a camera mode in which the processor is configured to process image data captured by the first and second cameras; when a predetermined trigger condition is satisfied, the processor being configured to cause the first display to concurrently display a video feed of the image data captured by the second camera and a video feed of image data received via a computer network from a remote computing device, and to cause the second display to concurrently display the video feed of image data captured by the second camera and the video feed of the image data received via the computer network from the remote computing device. In this aspect, additionally or alternatively, the mobile computing device may further comprise a hinge configured to couple the first and second parts of the housing and permit the first and second displays to rotate between angular orientations from a face-to-face angular orientation to a back-to-back angular orientation; and an angle sensor mounted in the housing and configured to detect a relative angular displacement between the first and second parts of the housing, the predetermined trigger condition being when the angle sensor senses the back-to-back angular orientation of the first and second parts of the housing. In this aspect, additionally or alternatively, when the predetermined trigger condition is satisfied, the processor may be configured to send image data from the first and second cameras to the remote computing device via the computer network, causing the remote computing device to display a video feed of the image data captured by the first and second cameras of the mobile computing device on a display device of the remote computing device. In this aspect, additionally or alternatively, the image data of the first and second cameras may be captured concurrently, and the processor may be configured to record in memory the video feeds of the concurrently captured image data from the first and second cameras. In this aspect, additionally or alternatively, the processor may be further configured to cause the first display to concurrently display a video feed of the image data captured by the first camera, the video feed of image data received via a computer network from the remote computing device, and the video feed of the image data captured by the second camera. In this aspect, additionally or alternatively, the processor may be further configured to cause the second display to concurrently display a video feed of the image data captured by the first camera, the video feed of image data received via a computer network from the remote computing device, and the video feed of the image data captured by the second camera. In this aspect, additionally or alternatively, the first camera may capture image data of a first user, and the second camera may capture image data of a second user, the first user facing the first part of the housing and the second user facing the second part of the housing when the predetermined trigger condition is satisfied. In this aspect, additionally or alternatively, the image data received from the remote computing device may capture image data of a third user facing a camera of the remote computing device. In this aspect, additionally or alternatively, the back-to-back orientation may be between about 270 and 360 degrees. In this aspect, additionally or alternatively, the back-to-back orientation may be between about 310 and 360 degrees.

Another aspect provides a method comprising satisfying a predetermined trigger condition, and responsive to satisfying the predetermined trigger condition when in a camera mode, causing a first display to concurrently display a video feed of image data captured by a second camera and a video feed of image data received via a computer network from a remote computing device, and causing a second display to concurrently display the video feed of image data captured by the second camera and the video feed of the image data received via the computer network from the remote computing device. In this aspect, additionally or alternatively, satisfying the predetermined trigger condition may be sensing a back-to-back angular orientation of first and second parts of a housing of a mobile computing device, the first and second parts including respective first and second displays and respective first and second cameras, the first and second parts being coupled by a hinge that permits the first and second displays to rotate between angular orientations from a face-to-face angular orientation to the back-to-back angular orientation. In this aspect, additionally or alternatively, the sensing may be performed by one or more of a hinge angle sensor coupled to the hinge and a pair of inertial measurement units positioned in each of the first part and second part of the housing. In this aspect, additionally or alternatively, the method may further comprise upon sensing the predetermined trigger condition, sending image data from the first and second cameras to the remote computing device via the computer network, causing the second remote device to display a video feed of the image data from the first and second cameras of the mobile computing device on the display device of the remote computing device. In this aspect, additionally or alternatively, the image data of the first and second cameras may be captured concurrently; and video feeds of the concurrently captured image data from the first and second cameras may be recorded into memory. In this aspect, additionally or alternatively, the first camera may capture image data of a first user, and the second camera may capture image data of a second user, the first user facing the first part of the housing and the second user facing the second part of the housing when the back-to-back angular orientation of the first and second parts of the housing is sensed. In this aspect, additionally or alternatively, the image data received from the remote computing device may capture image data of a third user facing a camera of the remote computing device.

Another aspect provides a mobile computing device comprising a mobile computing device comprising a housing having a first part and a second part, the first part including a first display and the second part including a second display; a first camera mounted in the first part of the housing; a second camera mounted in the second part of the housing; and a processor mounted in the housing and configured to operate in a camera mode in which the processor is configured to process image data captured by the first and second cameras; when a predetermined trigger condition is satisfied, the processor being configured to cause the first display to concurrently display a video feed of the image data captured by the second camera and a video feed of image data received via a computer network from a remote computing device, and to cause the second display to concurrently display the video feed of image data captured by the second camera and the video feed of the image data received via the computer network from the remote computing device; the first camera capturing image data of a first user, and the second camera capturing image data of a second user, the first user facing the first part of the housing and the second user facing the second part of the housing when the predetermined trigger condition is satisfied; and the image data received from the remote computing device capturing image data of a third user facing the camera of the remote computing device. In this aspect, additionally or alternatively, the mobile computing device may further comprise a hinge configured to couple the first and second parts of the housing and permit the first and second displays to rotate between angular orientations from a face-to-face angular orientation to a back-to-back angular orientation; and an angle sensor mounted in the housing and configured to detect a relative angular displacement between the first and second parts of the housing, the predetermined trigger condition being when the angle sensor senses the back-to-back angular orientation of the first and second parts of the housing. In this aspect, additionally or alternatively, when the predetermined trigger condition is satisfied, the processor may be configured to transition the camera mode from a one-to-one video mode to a group video chat mode.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device, comprising:
a housing having a first part and a second part, the first part including a first display and the second part including a second display;
a first camera mounted in the first part of the housing;
a second camera mounted in the second part of the housing; and
a processor mounted in the housing and configured to operate in a camera mode in which the processor is configured to process image data captured by the first and second cameras;
a hinge configured to couple the first and second parts of the housing and permit the first and second displays to rotate between angular orientations from a face-to-face angular orientation to a back-to-back angular orientation; and
an angle sensor mounted in the housing and configured to detect a relative angular displacement between the first and second parts of the housing, wherein
when a predetermined trigger condition is satisfied, the processor is configured to transition from a first display mode to a second display mode, the first display mode configured to cause the first display to concurrently display a video feed of the image data captured by the second camera and cause the second display to concurrently display a video feed of the image data captured by the first camera, the second display mode configured to cause the first display to concurrently display the video feed of the image data captured by the second camera and a video feed of image data received via a computer network from a remote computing device, and to cause the second display to concurrently display the video feed of image data captured by the second camera and the video feed of the image data received via the computer network from the remote computing device; and
the predetermined trigger condition is when the angle sensor senses the back-to-back angular orientation of the first and second parts of the housing.

2. The mobile computing device of claim 1, wherein when the predetermined trigger condition is satisfied, the processor is configured to send image data from the first and second cameras to the remote computing device via the computer network, causing the remote computing device to display a video feed of the image data captured by the first and second cameras of the mobile computing device on a display device of the remote computing device.

3. The mobile computing device of claim 1, wherein
the image data of the first and second cameras is captured concurrently; and
the processor is configured to record in memory the video feeds of the concurrently captured image data from the first and second cameras.

4. The mobile computing device of claim 1, wherein
the processor is further configured to cause the first display to concurrently display a video feed of the image data captured by the first camera, the video feed of image data received via a computer network from the remote computing device, and the video feed of the image data captured by the second camera.

5. The mobile computing device of claim 1, wherein
the processor is further configured to cause the second display to concurrently display a video feed of the image data captured by the first camera, the video feed of image data received via a computer network from the remote computing device, and the video feed of the image data captured by the second camera.

6. The mobile computing device of claim 1, wherein
the first camera captures image data of a first user, and the second camera captures image data of a second user, the first user facing the first part of the housing and the second user facing the second part of the housing when the predetermined trigger condition is satisfied.

7. The mobile computing device of claim 6, wherein
the image data received from the remote computing device captures image data of a third user facing a camera of the remote computing device.

8. The mobile computing device of claim 1, wherein the back-to-back orientation is between about 270 and 360 degrees.

9. The mobile computing device of claim 8, wherein the back-to-back orientation is between about 310 and 360 degrees.

10. A computer-implemented communication method, comprising:
satisfying a predetermined trigger condition;
responsive to satisfying the predetermined trigger condition when in a camera mode, transitioning from a first display mode to a second display mode, the first display mode configured to cause the first display to concurrently display a video feed of the image data captured by the second camera and cause the second display to concurrently display a video feed of the image data captured by the first camera, the second display mode configured to cause a first display to concurrently display the video feed of image data captured by a second camera and a video feed of image data received via a computer network from a remote computing device, and causing a second display to concurrently display the video feed of image data captured by the second camera and the video feed of the image data received via the computer network from the remote computing device, wherein
satisfying the predetermined trigger condition is sensing a back-to-back angular orientation of first and second parts of a housing of a mobile computing device, the first and second parts including respective first and second displays and respective first and second cameras, the first and second parts being coupled by a hinge that permits the first and second displays to rotate between angular orientations from a face-to-face angular orientation to the back-to-back angular orientation.

11. The method of claim 10, wherein the sensing is performed by one or more of a hinge angle sensor coupled to the hinge and a pair of inertial measurement units positioned in each of the first part and second part of the housing.

12. The method of claim 10, further comprising:
upon sensing the predetermined trigger condition, sending image data from the first and second cameras to the remote computing device via the computer network, causing the second remote device to display a video feed of the image data from the first and second cameras of the mobile computing device on the display device of the remote computing device.

13. The method of claim 10, wherein
the image data of the first and second cameras is captured concurrently; and
video feeds of the concurrently captured image data from the first and second cameras are recorded into memory.

14. The method of claim 10, wherein
the first camera captures image data of a first user, and the second camera captures image data of a second user, the first user facing the first part of the housing and the second user facing the second part of the housing when the back-to-back angular orientation of the first and second parts of the housing is sensed.

15. The method of claim 10, wherein
the image data received from the remote computing device captures image data of a third user facing a camera of the remote computing device.

16. A mobile computing device, comprising:
a housing having a first part and a second part, the first part including a first display and the second part including a second display;
a first camera mounted in the first part of the housing;
a second camera mounted in the second part of the housing; and
a processor mounted in the housing and configured to operate in a camera mode in which it is configured to process image data captured by the first and second cameras;
a hinge configured to couple the first and second parts of the housing and permit the first and second displays to rotate between angular orientations from a face-to-face angular orientation to a back-to-back angular orientation; and
an angle sensor mounted in the housing and configured to detect a relative angular displacement between the first and second parts of the housing, wherein
when a predetermined trigger condition is satisfied, the processor is configured to transition from a first display mode to a second display mode, the first display mode configured to cause the first display to concurrently display a video feed of the image data captured by the second camera and cause the second display to concurrently display a video feed of the image data captured by the first camera, the second display mode configured to cause the first display to concurrently display the video feed of the image data captured by the second camera and a video feed of image data received via a computer network from a remote computing device, and to cause the second display to concurrently display the video feed of image data captured by the second camera and the video feed of the image data received via the computer network from the remote computing device;
the first camera captures image data of a first user, and the second camera captures image data of a second user, the first user facing the first part of the housing and the second user facing the second part of the housing when the predetermined trigger condition is satisfied;
the image data received from the remote computing device captures image data of a third user facing the camera of the remote computing device; and
the predetermined trigger condition is when the angle sensor senses the back-to-back angular orientation of the first and second parts of the housing.

17. The mobile computing device of claim 16, wherein
when the predetermined trigger condition is satisfied, the processor is configured to transition the camera mode from a one-to-one video mode to a group video chat mode.

* * * * *